(12) United States Patent
Taillard

(10) Patent No.: US 11,548,476 B2
(45) Date of Patent: Jan. 10, 2023

(54) WINDSCREEN WIPER DEVICE

(71) Applicant: TRICO BELGIUM S.A., Aubange (BE)

(72) Inventor: Arthur Taillard, Herserange (FR)

(73) Assignee: TRICO BELGIUM S.A., Aubange (BE)

( * ) Notice: Subject to any disclaimer, the term of this patent is extended or adjusted under 35 U.S.C. 154(b) by 519 days.

(21) Appl. No.: 16/316,197

(22) PCT Filed: Jul. 8, 2016

(86) PCT No.: PCT/EP2016/066334
§ 371 (c)(1),
(2) Date: Jan. 8, 2019

(87) PCT Pub. No.: WO2018/006983
PCT Pub. Date: Jan. 11, 2018

(65) Prior Publication Data
US 2021/0291791 A1   Sep. 23, 2021

(51) Int. Cl.
*B60S 1/48* (2006.01)
*B60S 1/34* (2006.01)
*B60S 1/38* (2006.01)

(52) U.S. Cl.
CPC ........... *B60S 1/3481* (2013.01); *B60S 1/3849* (2013.01)

(58) Field of Classification Search
CPC .... B60S 1/3481; B60S 1/3484; B60S 1/3479; B60S 1/345; B60S 1/34; B60S 1/04;
(Continued)

(56) References Cited

U.S. PATENT DOCUMENTS 5,233,720 A * 8/1993 Schon ................. B60S 1/34
15/250.31
2002/0152575 A1   10/2002 Tsukamoto et al.

FOREIGN PATENT DOCUMENTS

DE     102004017447     11/2005
EP        3015323 A1     5/2016
(Continued)

*Primary Examiner* — Katina N. Henson
(74) *Attorney, Agent, or Firm* — Bryan Cave Leighton Paisner LLP

(57) ABSTRACT

A windscreen wiper device, particularly for automobiles, comprising an elongated wiper blade of a flexible material, which can be placed in abutment with a windscreen to be wiped, the wiper blade comprising a connecting device for an oscillating arm, wherein the oscillating arm near one end thereof is pivotally connected to the wiper blade (2) and near the other end thereof is connected to a mounting head on a drive shaft for transferring a reciprocal movement to the wiper blade, wherein the windscreen wiper device further comprises a cap detachably connected to the mounting head at the location where the oscillating arm is connected to the mounting head, wherein the cap is snapped onto an outer wall of the mounting head in axial direction thereof, with the special feature that the cap comprises at least one resilient, downwardly extending tongue having a hole, wherein the outer wall of the mounting head comprises a laterally outwardly extending protrusion engaging in the hole of the tongue, and wherein the resilient tongue is hingeable along an hinge axis between an inward position retaining the cap onto the mounting head and an outward position releasing the cap from the mounting head.

10 Claims, 5 Drawing Sheets

Figure 1:
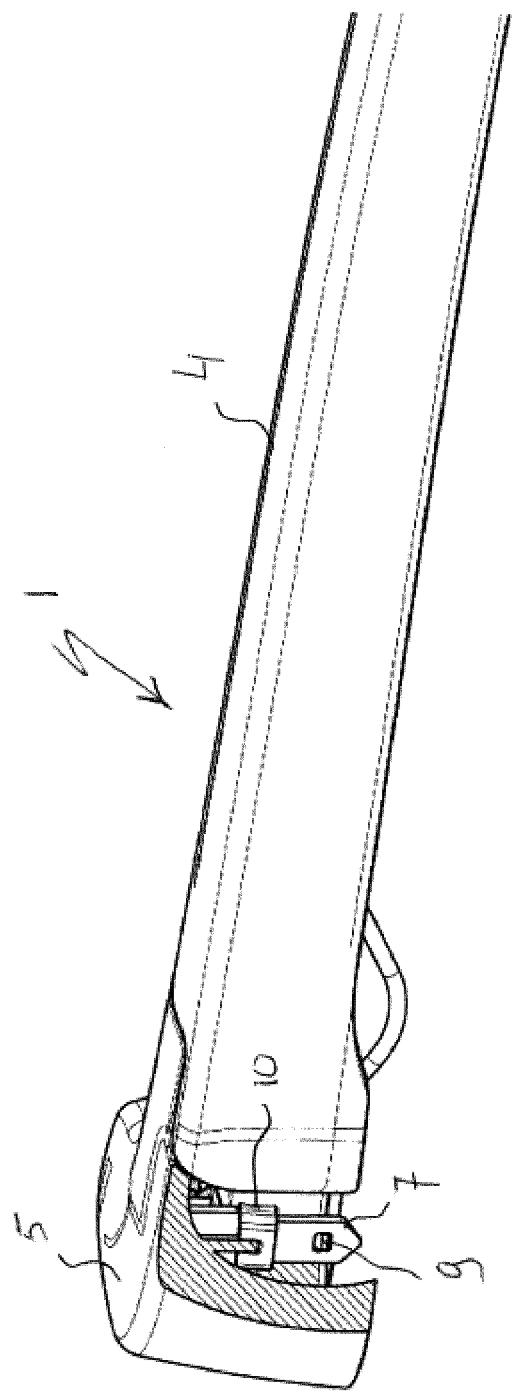

(58) Field of Classification Search
CPC ........ B60S 1/3493; B60S 1/3489; B60S 1/32; Y10T 403/17; Y10T 403/15
USPC ........ 15/250.34, 250.351, 250.352, 250.001, 15/246; 403/23, 10
See application file for complete search history.

(56) References Cited

FOREIGN PATENT DOCUMENTS

| | | |
|---|---|---|
| JP | 2002067886 | 3/2002 |
| JP | 2006 298146 A | 11/2006 |

\* cited by examiner

WINDSCREEN WIPER DEVICE

BACKGROUND

1. Technical Field

The present invention relates to a windscreen wiper device, particularly for automobiles, comprising an elongated wiper blade of a flexible material, which can be placed in abutment with a windscreen to be wiped, the wiper blade comprising a connecting device for an oscillating arm, wherein the oscillating arm near one end thereof is pivotally connected to the wiper blade and near the other end thereof is connected to a mounting head on a drive shaft for transferring a reciprocal movement to the wiper blade, wherein the windscreen wiper device further comprises a cap detachably connected to the mounting head at the location where the oscillating arm is connected to the mounting head, wherein the cap is snapped onto an outer wall of the mounting head in axial direction thereof.

The present invention also refers to such a cap as a separate constructional element.

2. Related Art

Such a windscreen wiper device and cap are known from German patent publication no. 10 2004 017 447 (Volkswagen AG). In this known windscreen wiper device the cap comprises protrusions extending inwardly from an inner wall of the cap, which protrusions cooperate in engaging relationship with stop surfaces on the outer wall of the mounting head However, in practice it has been apparent that such a cap easily can get loose from the mounting head, for example during washing of the automobile in a car wash.

SUMMARY

It is the object of the invention to improve the prior art, particularly to provide a windscreen wiper device, wherein the cap and the mounting head are interconnected in a simple, through durable and solid, though detachable manner.

In order to accomplish that objective a windscreen wiper device of the type mentioned in the preamble is characterized according to the invention in that the cap and the outer wall of the mounting head comprises mutually cooperating resilient tongue/protrusion means, wherein the protrusion snappingly engages in a hole of the resilient tongue, and wherein the resilient tongue is hingeable along an hinge axis between an inward position retaining the cap onto the mounting head and an outward position releasing the cap from the mounting head. In the framework of the present invention the cap and the mounting head are interconnected through a snapping operation, wherein the resilient tongue on the cap or the mounting head is initially pushed out- or inwardly against a spring force and then allowed to spring back, so that the protrusion provided on the mounting head or the cap engages into the hole in the resilient tongue, thus snapping, that is clipping the resilient tongue onto the protrusion. By subsequently pushing out or in again the resilient tongue against the spring force, the cap may be released from the mounting head. A reliable interconnection of the cap and the mounting head is achieved, while the risk of losing the cap is avoided.

Preferably, the outer wall of the mounting head comprises at least one resilient tongue having the hole, and wherein an inner wall of the cap comprises a laterally inwardly extending protrusion engaging in the hole of the tongue. Particularly, the hole has a closed circumference. More in particular, the resilient tongue is in one piece with the mounting head. More in particular, the mounting head comprises two opposing resilient tongues cooperating with two laterally inwardly extending protrusions of the cap. Preferably, the resilient tongue extends upwardly. In another preferred embodiment the resilient tongue extends downwardly. Preferably the inner wall of the cap comprises a guiding element for guiding the resilient tongue. Particularly, the guiding element has a U-shaped cross-section. More in particular, the guiding element is in one piece with the cap.

In a preferred embodiment of a windscreen wiper device of the present invention the cap comprises at least one resilient tongue having the hole, wherein the outer wall of the mounting head comprises a laterally outwardly extending protrusion engaging in the hole of the tongue. Preferably, the resilient tongue extends downwardly, while in another preferred embodiment the resilient tongue extends upwardly, the resilient tongue may extend from a top wall of the cap, whereas in another preferred embodiment the resilient tongue extends from a side wall of the cap.

Preferably, the resilient tongue is made in one piece with the cap, particularly being made of plastic. In order to enhance the retention of the cap onto the mounting head, the hole in the resilient tongue preferably has a closed circumference. Accordingly, the cap is safely clipped onto the mounting head.

Preferably, the protrusion is provided with an inclined guiding surface to facilitate engagement of the protrusion inside the hole in the resilient tongue. Hence, it will be easy, that is it will takes less force to mount the cap onto the mounting head, whereas it will be difficult (i.e. it will take considerable force) to dismount the cap.

It is noted that the present invention is not restricted to the use in automobiles, but can also be used in other fast vehicles, such as railway coaches.

Further it is noted that the present invention can be used in so-called "flat blades", but also in traditional blades having yokes. In the latter case, the connecting device may be formed by a main yoke.

In a preferred embodiment of a windscreen wiper device in accordance with the invention the outer wall of the mounting head comprising a guiding element for guiding the resilient tongue in downward direction. Preferably, the guiding element has a U-shaped cross-section, so that the resilient tongue on the cap is guided between legs and a base of the U-shaped cross-section, as well as the outer wall of the mounting head in a reliable, controllable manner in a direction towards the protrusion of the mounting head, i.e. towards a windscreen to be wiped.

In another preferred embodiment of a windscreen wiper device according, to the invention the guiding element is in one piece with the mounting head.

In another preferred embodiment of a windscreen wiper device in accordance with the invention the protrusion is facing towards a windscreen to be wiped, and wherein the guiding element is facing away from a windscreen to be wiped.

In another preferred embodiment of a windscreen wiper device according to the invention the cap comprises two opposing resilient, downwardly extending tongues cooperating with two laterally outwardly extending protrusions on the outer wall of the mounting head. Retention of the cap is hereby enhanced.

In another preferred embodiment of a windscreen wiper device in accordance with the invention the cap comprises at least one clamping claw for clamping around the outer wall of the mounting head. This clamping claw functions as extra retentions means for retaining the cap onto the mounting head. The clamping claw is preferably in one piece with the cap and is preferably U-shaped, so that legs of the U-shape can be snapped around the outer wall of the mounting head. Particularly, there are two clamping claws spaced-apart around an inner wall of the cap.

As indicated, the present invention also relates to a cap as a single constructional element comprising at least one resilient, downwardly extending tongue having a hole and arranged to be snapped onto a laterally outwardly extending protrusion on an outer wall of a mounting head of a windscreen wiper device, wherein the resilient tongue is hingeable along an hinge axis between an inward position retaining the cap onto the mounting head and an outward position releasing the cap from the mounting head.

THE DRAWINGS

Figure 2:
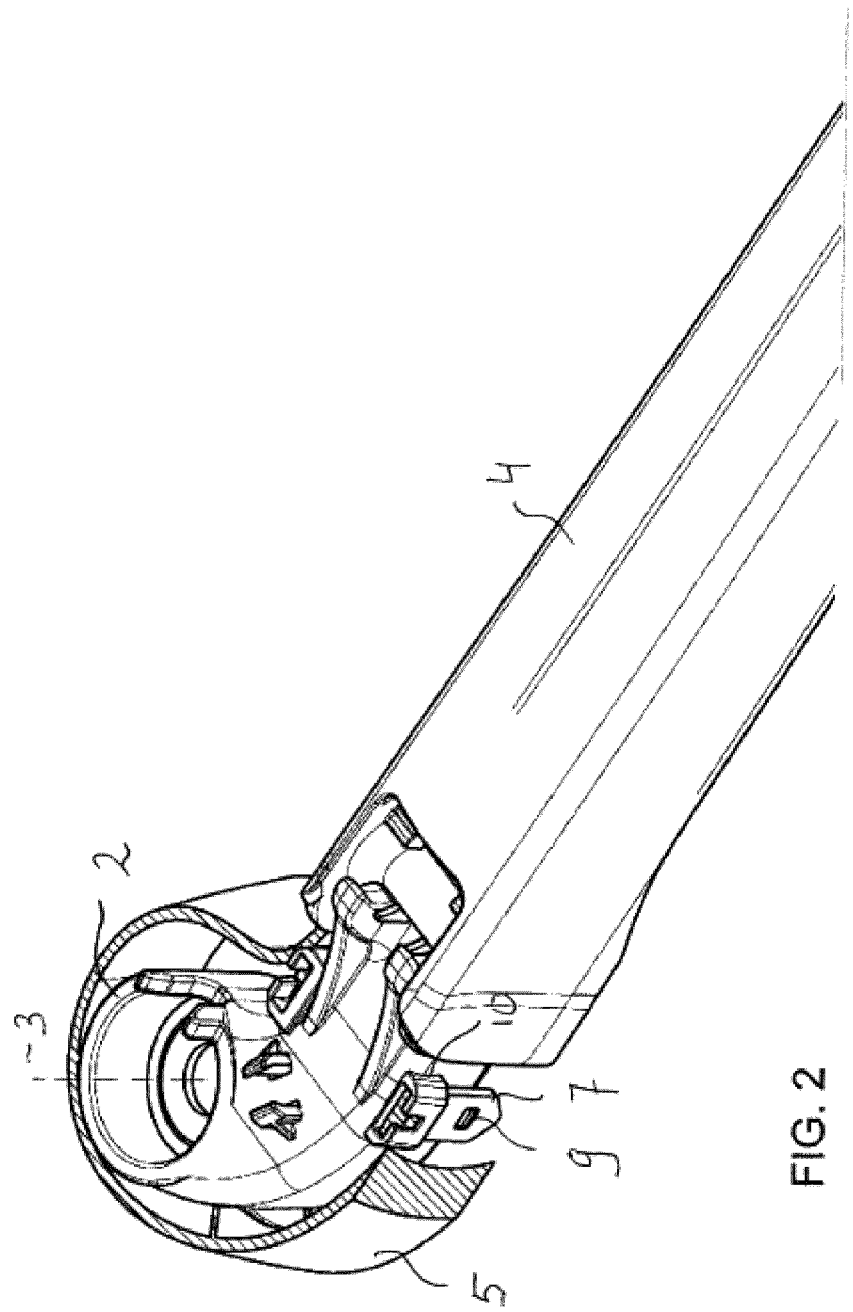
Figure 3:
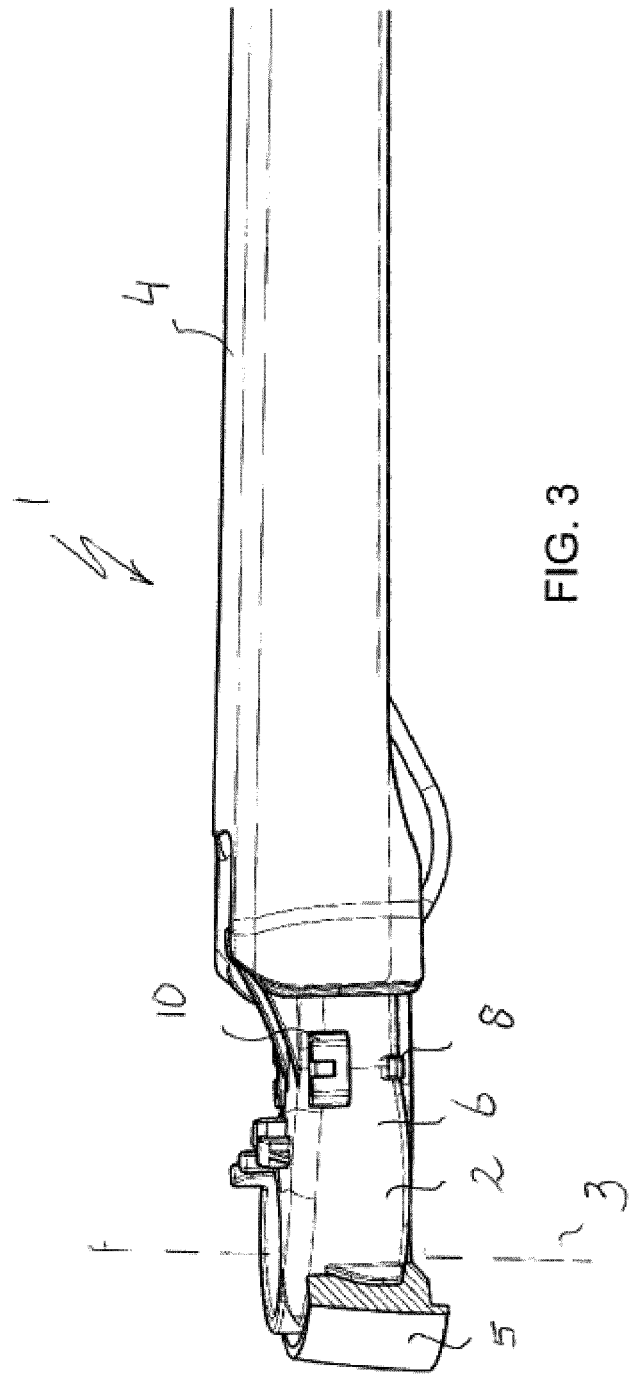
Figure 4:
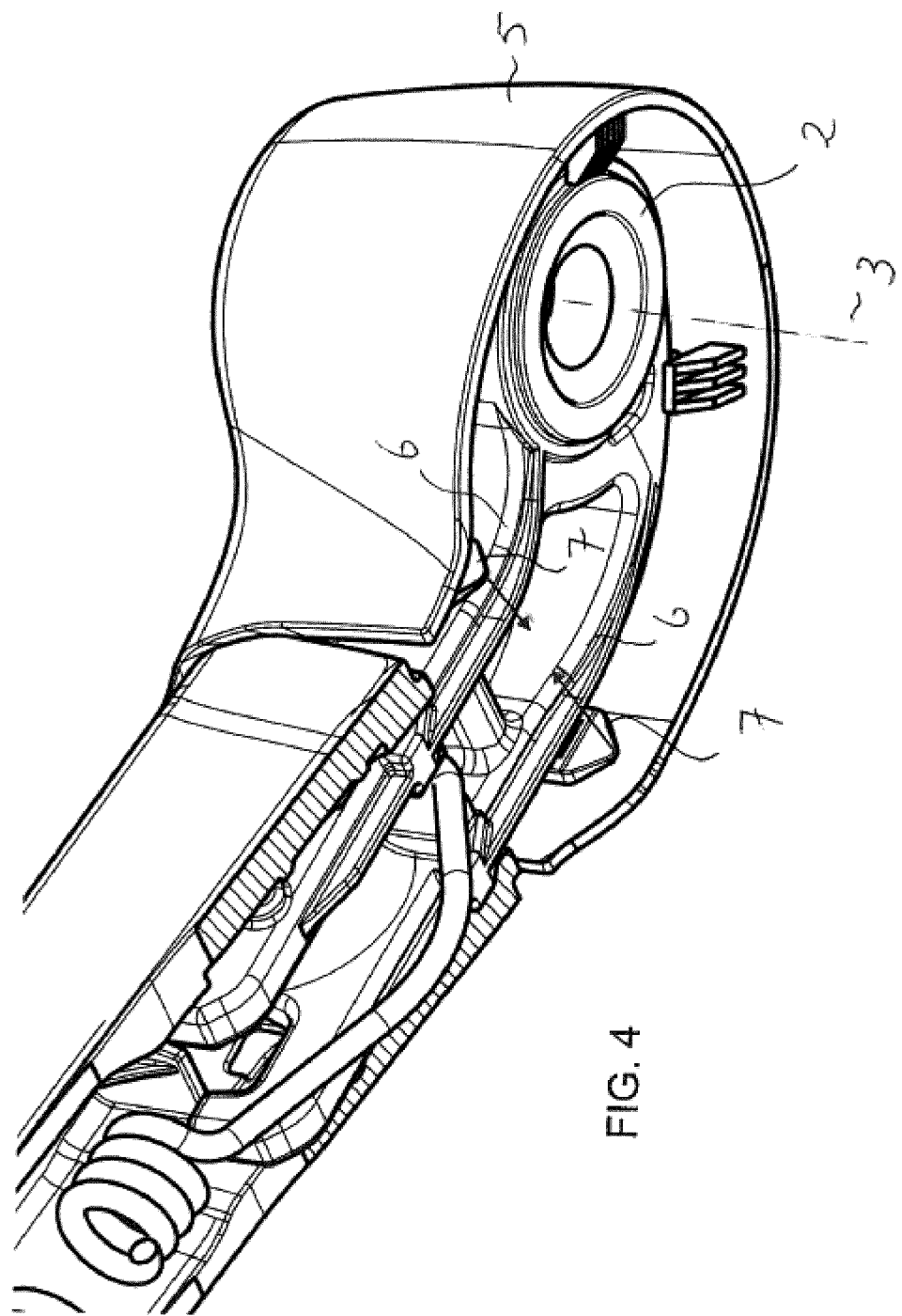

The invention will now be explained in more detail with reference to figures illustrated in a drawing, wherein:

FIG. 1 is a perspective and schematic view, partly cut away, of a preferred embodiment of a windscreen wiper device in accordance with the invention, without a connecting device for a wiper blade and without a wiper blade;

FIGS. 2 and 3 correspond to FIG. 1 in a view from above and in a side view, respectively, on the understanding that the cap is partly cut away;

FIG. 4 corresponds to FIG. 1 in a view from below; and

Figure 5:
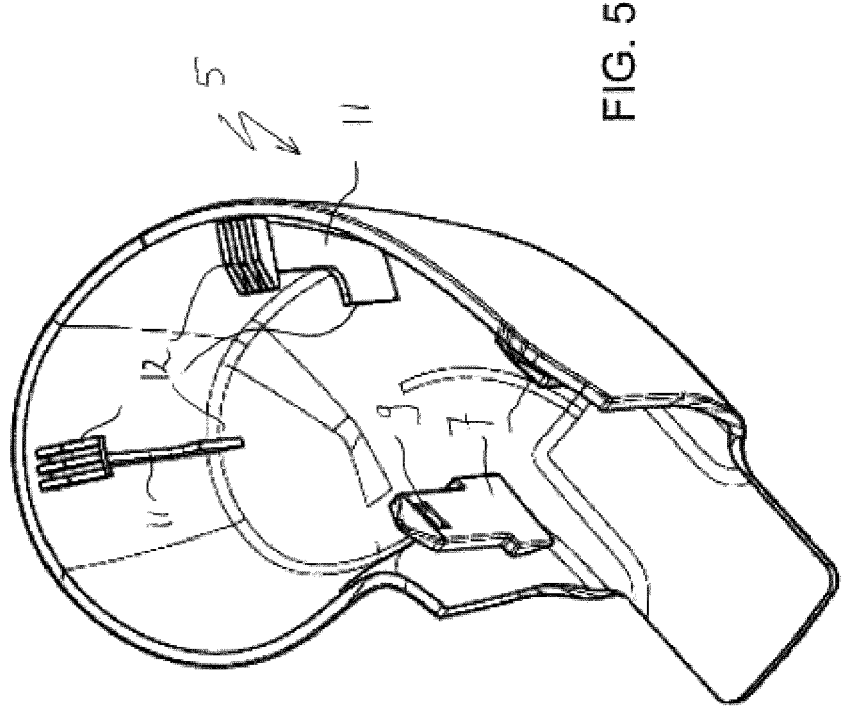

FIG. 5 shows a perspective and schematic view of the cap, seen from below.

DETAILED DESCRIPTION

The windscreen wiper device 1 relates to a so-called "flat blade" built up in a usual manner of an elastomeric wiper blade, in the longitudinal sides of which opposing longitudinal grooves are formed, and of longitudinal strips made of spring band steel, which are fitted in the longitudinal grooves, the strips form a flexible carrier element for the wiper blade, as it were, which is thus biased in a curved position (the curvature in operative position being that of a windscreen to be wiped).

Neighbouring ends of the strips at both ends of the wiper blade may be interconnected by means of a connecting piece or "end cap" functioning as clamping member. The connecting pieces may be a separate constructional element, which may be form-locked ("positive locking" or "having a positive fit") or force-locked to the ends of the strips. In another preferred embodiment, the connecting pieces may be in one piece with the strips made of spring band steel. In the latter case the connecting piece forms a transverse bridge for the strips, as it were.

As a skilled person would appreciate, the windscreen wiper device 1 is furthermore built up of a connecting device of plastic material for an oscillating. Alternatively, the connecting device may also be made of metal, such as steel or aluminium. The connecting device may comprise clamping members that are integral therewith, which engage around longitudinal sides of the strips that face away from each other, as a result of which the connecting device is firmly attached to the unit consisting of the wiper blade and the strips. The oscillating arm is pivotally connected to the wiper blade.

As illustrated in FIGS. 1 through 4, the windscreen wiper device 1 according to the invention comprises a plastic or metallic mounting head 2 which can be fixed for rotation to a shaft 3 driven, via a mechanism not illustrated, by a small motor. In use, the shaft 3 rotates alternately in a clockwise and in a counter-clockwise sense carrying the mounting head 2 into rotation also, which in turn draws an oscillating arm 4 in rotation and thereby moves the wiper blade.

The windscreen wiper device 1 further comprises a plastic or metallic cap or cover 5 being detachably connected to the mounting head 2 at the location where the oscillating arm 4 is connected to the mounting head 2, the cap 5 is snapped onto outer walls 6 of the mounting head 2 in axial direction thereof. More in particular, the cap 5 comprises integral therewith two opposing resilient, downwardly extending tongues 7 cooperating in the following manner with two laterally outwardly extending protrusions 8 on the outer walls 6 of the mounting head 2.

By pressing the cap 5 in vertical direction onto the mounting head 2, the resilient tongues 7 are first pressed outwardly under the influence of the protrusions 8 on the outer walls 6 of the mounting head 2, that is in outward direction, until the resilient tongues 7 are subsequently allowed to spring back (in a direction of arrows shown in FIG. 4) against a spring force, thus snapping or clipping the cap 5 onto the mounting head 2, the protrusions 8 on the outer walls 6 of the mounting head 2 then engage into holes 9 of the resilient tongues 7, As shown, the holes 9 each have a closed circumference.

As shown in FIGS. 1, 2 and 3, the outer walls 6 of the mounting head 2 comprise opposite guiding elements 10 having a U-shaped cross-section for guiding the resilient tongues 7 in downward direction towards the protrusions 8 between legs and a base of the U-shaped cross-section and between the corresponding outer wall 6.

As an extra retention use is made of two spaced-apart, U-shaped clamping claws 11 integral with the cap 5 (see FIG. 5) in order to clamp the mounting head 2 between legs 12 of the U-shape thereof.

The invention is not restricted to the embodiment shown, but extends also to other preferred embodiments falling within the scope of the appended claims. For example, a skilled person will appreciate that the use of the cap 5 is not restricted to so-called "flat blades", but also extends to traditional blades having yokes. The connecting device may then be formed by a main yoke to be connected to the oscillating arm 4.

The invention claimed is:

1. A windscreen wiper device, comprising an oscillating arm connected to a mounting head mountable on a drive shaft for transferring a reciprocal movement, wherein said windscreen wiper device further comprises a cap detachably connected to said mounting head at the location where said oscillating arm is connected to said mounting head, wherein said cap is snapped onto an outer wall of said mounting head in axial direction thereof, wherein, a resilient tongue extends downwardly from an internal top surface of said cap, the resilient tongue being adapted to engage a protrusion that extends laterally outward from a side wall of said mounting head;

a hole having a closed circumference extends through said resilient tongue;

said resilient tongue and said protrusion are configured to form a connection that enables said cap to be coupled to said mounting head; and said connection between said cap and said mounting head is formed by pressing said cap in a vertical direction onto said protrusion, wherein said resilient tongue is adapted to flex outward when said resilient tongue engages said protrusion and snap inwardly when said protrusion engages, and extends through, said hole in said resilient tongue.

2. A windscreen wiper device according to claim 1, wherein said outer wall of said mounting head comprises a guiding element for guiding said resilient tongue in downward direction.

3. A windscreen wiper device according to claim 2, wherein said guiding element has a U-shaped cross-section.

4. A windscreen wiper device according to claim 2, wherein said guiding element is in one piece with the mounting head.

5. A windscreen wiper device according to claim 2, wherein said protrusion is facing towards a windscreen to be wiped, and wherein said guiding element is facing away from a windscreen to be wiped.

6. A windscreen wiper device according to claim 1, wherein said resilient tongue is in one piece with said cap.

7. A windscreen wiper device according to claim 1, wherein said cap comprises two opposing resilient, downwardly extending tongues cooperating with two laterally outwardly extending protrusions on said outer wall of said mounting head.

8. A windscreen wiper device according to claim 1, wherein said cap comprises at least one clamping claw for clamping around said outer wall of said mounting head.

9. A cap as defined in a windscreen wiper device according to claim 1.

10. A windscreen wiper device according to claim 8, wherein the at least one clamping claw is adjacent to a first end of the cap, the at least one clamping claw further comprising a leg portion that extends from a second end of the cap to the first end of the cap, wherein the at least one clamping claw and the leg portion form a cavity to further retain the cap on the mounting head.

* * * * *